UNITED STATES PATENT OFFICE.

J. C. TUCKER AND L. LANSZWEERT, OF SAN FRANCISCO, CALIFORNIA.

IMPROVEMENT IN THE MANUFACTURE OF SUGAR.

Specification forming part of Letters Patent No. 21,786, dated October 12, 1858.

*To all whom it may concern:*

Be it known that we, J. C. TUCKER and L. LANSZWEERT, of San Francisco, in the county of San Francisco, State of California, have invented a new and improved process for defecating saccharine liquids or solutions of sugar and removing the color from the same to be used in the manufacture and refining of sugar; and we do hereby declare that the following is a full and exact description thereof.

The nature of our invention consists in clarifying with the hydrate of alumina in that particular state of precipitation which state alone yields to animal coal its special properties, and which differs in effects from the precipitates obtained in the usual known manner.

To enable others skilled in the art to make and use our improvement, we will proceed to describe its manufacture.

The hydrate of alumina is made by dissolving bisulphate of alumina, composed of alumina fifty-eight parts, sulphuric acid forty-two parts, in its weight of pure water at a temperature of 60° Fahrenheit, precipitating carefully the solution by adding gradually a solution of carbonate of soda. This precipitate, carefully washed first with warm then with cold water, presents a light, friable, and spongeous mass, and obtained in this particular state has a more vigorous action as a defecating agent. Repeated experiments made to ascertain the comparative strength of this agent prepared in this manner with the hydrates obtained in the usual manner and the best decolorizing-coal, prove it to be far superior to the former and as one to fifteen to the latter.

By the addition of hydrated alumina prepared as described vegetable juices and saccharine liquids are wholly or in part deprived of their coloring-matter. The defecating and decolorizing action of the said agent is greatly increased by the application of heat. Used in the manufacture and refining of sugars, molasses, &c., it should be employed both in the "blow-up" and in the "filters" in the manner observed in the use of other defecating agents. We do not claim the hydrate of alumina as usually found in the trade in nature, as claimed to be prepared dry by the Messrs. Oxyland or precipitated by ammonia; but What we do claim as our invention, and desire to secure by Letters Patent, is—

In the process of decolorizing and defecating saccharine liquids and vegetable juices, the use and application in the manner described herein of hydrated alumina, (cream of alumina,) prepared as above set forth.

J. C. TUCKER.
     L. LANSZWEERT.

Witnesses:
 JNO. L. ECKLEY,
 P. BENNET.